(12) United States Patent
Shushkovsky et al.

(10) Patent No.: US 11,216,155 B2
(45) Date of Patent: Jan. 4, 2022

(54) SYSTEMS AND METHODS FOR DATA PROCESSING

(71) Applicant: FMR LLC, Boston, MA (US)

(72) Inventors: Alexander Shushkovsky, Millburn, NJ (US); Edward Colletta, Carle Place, NY (US); Yingyi Dang, Green Brook, NJ (US); Rocco Demalia, Worcester, MA (US); James Demalia, Worcester, MA (US); Eugene Kallivrousis, Astoria, NY (US); Stephen Gaudet, Tewksbury, MA (US)

(73) Assignee: FMR LLC, Boston, MA (US)

( * ) Notice: Subject to any disclaimer, the term of this patent is extended or adjusted under 35 U.S.C. 154(b) by 56 days.

(21) Appl. No.: 16/734,541

(22) Filed: Jan. 6, 2020

(65) Prior Publication Data
US 2021/0208742 A1    Jul. 8, 2021

(51) Int. Cl.
*G06F 3/0482* (2013.01)
*G06F 16/248* (2019.01)
*G06F 16/2455* (2019.01)

(52) U.S. Cl.
CPC .......... *G06F 3/0482* (2013.01); *G06F 16/248* (2019.01); *G06F 16/2456* (2019.01)

(58) Field of Classification Search
None
See application file for complete search history.

(56) References Cited

U.S. PATENT DOCUMENTS

| | | | | |
|---|---|---|---|---|
| 8,972,452 | B2 * | 3/2015 | Dave | G06F 16/254 |
| | | | | 707/796 |
| 9,003,294 | B1 * | 4/2015 | Ames | H04L 51/046 |
| | | | | 715/739 |
| 10,552,541 | B1 * | 2/2020 | Dreher | G06N 20/00 |
| 2005/0289147 | A1 * | 12/2005 | Kahn | G06F 16/972 |
| 2009/0259628 | A1 * | 10/2009 | Farrell | G06F 16/972 |
| 2009/0259631 | A1 * | 10/2009 | Farrell | G06F 16/24568 |
| 2011/0137894 | A1 * | 6/2011 | Narayanan | G06F 16/958 |
| | | | | 707/723 |
| 2011/0179020 | A1 * | 7/2011 | Ozzie | G06F 16/958 |
| | | | | 707/723 |
| 2014/0337361 | A1 * | 11/2014 | Gailis | G06F 16/9535 |
| | | | | 707/752 |
| 2015/0161214 | A1 * | 6/2015 | Kali | G06F 16/24558 |
| | | | | 707/758 |
| 2015/0269209 | A1 * | 9/2015 | Kemp | G06F 16/2379 |
| | | | | 705/319 |

(Continued)

*Primary Examiner* — Howard Cortes
(74) *Attorney, Agent, or Firm* — Proskauer Rose LLP

(57) ABSTRACT

A computer-implemented method is provided for permitting a user to manipulate data feeds via a graphical user interface. The method includes receiving, by a computing device, the data feeds over a communications network in real time from corresponding data sources and receiving from the user, by the computing device, via the graphical user interface an execution plan comprising a list of one or more actions to be performed on the data feeds. The method also includes sequentially executing, by the computing device, each of the actions in the execution plan on the real-time data feeds to generate one or more manipulated data feeds. The method further includes displaying, by the computing device, the manipulated data feeds to the user in a user-defined format via the graphical user interface.

16 Claims, 7 Drawing Sheets

(56) References Cited

U.S. PATENT DOCUMENTS

| | | | |
|---|---|---|---|
| 2016/0103916 A1* | 4/2016 | Even-Zohar | G06F 16/9535 |
| | | | 707/738 |
| 2016/0246616 A1* | 8/2016 | Kwong | G06Q 50/01 |
| 2017/0293508 A1* | 10/2017 | Mishra | G06F 16/904 |
| 2018/0276684 A1* | 9/2018 | Calzaretta | G06F 16/243 |
| 2018/0324051 A1* | 11/2018 | Dias | G06F 8/34 |
| 2019/0102280 A1* | 4/2019 | Caldato | G06F 9/5072 |
| 2019/0129996 A1* | 5/2019 | Chapman | G06F 16/337 |
| 2019/0147083 A1* | 5/2019 | Milligan | G06F 16/3344 |
| | | | 707/767 |
| 2020/0234321 A1* | 7/2020 | Urban | G06Q 10/0639 |

* cited by examiner

SYSTEMS AND METHODS FOR DATA PROCESSING

TECHNICAL FIELD

This application relates generally to systems, methods and apparatuses, including computer program products, for permitting a user to process streaming or static data feeds via a graphical user interface to generate desired outputs.

BACKGROUND

In today's market, there are a number of event processor engines or rule engines that can process data streams by applying a variety of analytical functions, but they are too application specific and generally do not provide simple controls that an average, non-developer user can master. Other engines may allow simple user controls, but are too generic and cannot provide sophisticated data processing and analytics required in today's business environment, such as manipulation of flow of market orders and executions. In addition, some of these engines maintain a user interface that is designed to work with either static data or limited streaming flow, while others can handle large sets of real-time, high-frequency streaming data, but require highly trained developers to operate. Further, most, if not all of these tools, require a multi-layered, non-real-time deployment process for each rule/process added.

Thus, a data processing tool is needed that allows non-developer users to quickly and efficiently analyze real-time data to respond to, for example, complex changes in market conditions and client requests. Specifically, the tool needs to allow users to create various processes to handle orders, executions and other data streams in order to generate alerts or notifications in real time or near real time in production environment without involving developer support.

SUMMARY

The present invention enables users to create, edit, test, debug and deploy complex sets of processing rules on one or more streaming or static data feeds using a web based user interface. The present invention also allows users to analyze rule performance and manage outputs (e.g., in the form of an alert) in real time in production environment. In some embodiments, a scale-able data processing engine is utilized in the backend to receive user instructions from the user interface, interpret the instructions in real time, process requested data flow(s), and communicate the results back to the user in a desired output format (e.g., as an alert). The engine can use its own autonomous data ontology and semantics to perform these tasks. Thus, the data processing tool of the present invention enables businesses in today's fast-evolving and complex market to easily set up alerts based on previously not available information in real time, thereby reducing exposure to risks.

In one aspect, the invention features a computer-implemented method for permitting a user to manipulate data feeds via a graphical user interface. The computer-implemented method includes receiving, by a computing device, the data feeds over a communications network in real time from corresponding data sources and receiving from the user, by the computing device, via the graphical user interface an execution plan comprising a list of one or more actions to be performed on the data feeds. The one or more actions are in a human-readable format. The method also includes sequentially executing, by the computing device, each of the actions in the execution plan on the real-time data feeds to generate one or more manipulated data feeds. Executing each action comprises applying at least one of (i) a function to at least one of the data feeds, (ii) a join command for joining two or more of the data feeds, or (iii) a condition command for filtering the data feeds. The method further includes displaying, by the computing device, the manipulated data feeds to the user in a user-defined format via the graphical user interface.

In another aspect, the invention features a computer system configured to manipulate data feeds based on instructions from a user. The computer system comprises a data intake module configured to receive the data feeds over a communications network in real time from corresponding data sources and a display module configured to generate a graphical user interface permitting the user to define an execution plan comprising a list of one or more actions, in a human-readable format, to be performed on the data feeds. The system also includes an execution module configured to sequentially execute each of the actions in the execution plan on the data feeds to generate one or more manipulated data feeds. The execution module is configured to apply at least one of (i) a function to at least one of the data feeds, (ii) a join command for joining two or more of the data feeds, or (iii) a condition command for filtering the data feeds. Further, the display module is configured to display the manipulated data feeds to the user in a user-defined format via the graphical user interface.

Any of the above aspects can include one or more of the following features. In some embodiments, the data feeds are received in real time at different times. In some embodiments, a collection of properties associated with each of the one or more data feeds are defined, and each data feed is mapped to a corresponding data source.

In some embodiments, joining two or more of the data feeds comprises joining the data feeds that have matching properties. In some embodiments, joining two or more of the data feeds comprises excluding a first data feed from a second data feed. In some embodiments, filtering the data feeds comprises determining if at least one of the data feeds has properties that match a filtering condition and returning the at least one data feed if a match is found.

In some embodiments, the function comprises a mathematical expression applied to values of a data feed.

In some embodiments, the one or more actions are converted from the human-readable format into a JavaScript Object Notation (JSON) format prior to executing the execution plan.

In some embodiments, the execution plan is tested and debugged in real-time without influencing another execution plan that is currently being executed.

In some embodiments, the user is allowed to subscribe to, via the graphical user interface, a future data feed whereby the computing device automatically parses the future data feed based on a user-specified property and returns the parsed data feed to the user.

In some embodiments, the computing device publishes the manipulated data feeds by sending the manipulated data feeds to a user-specified location.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
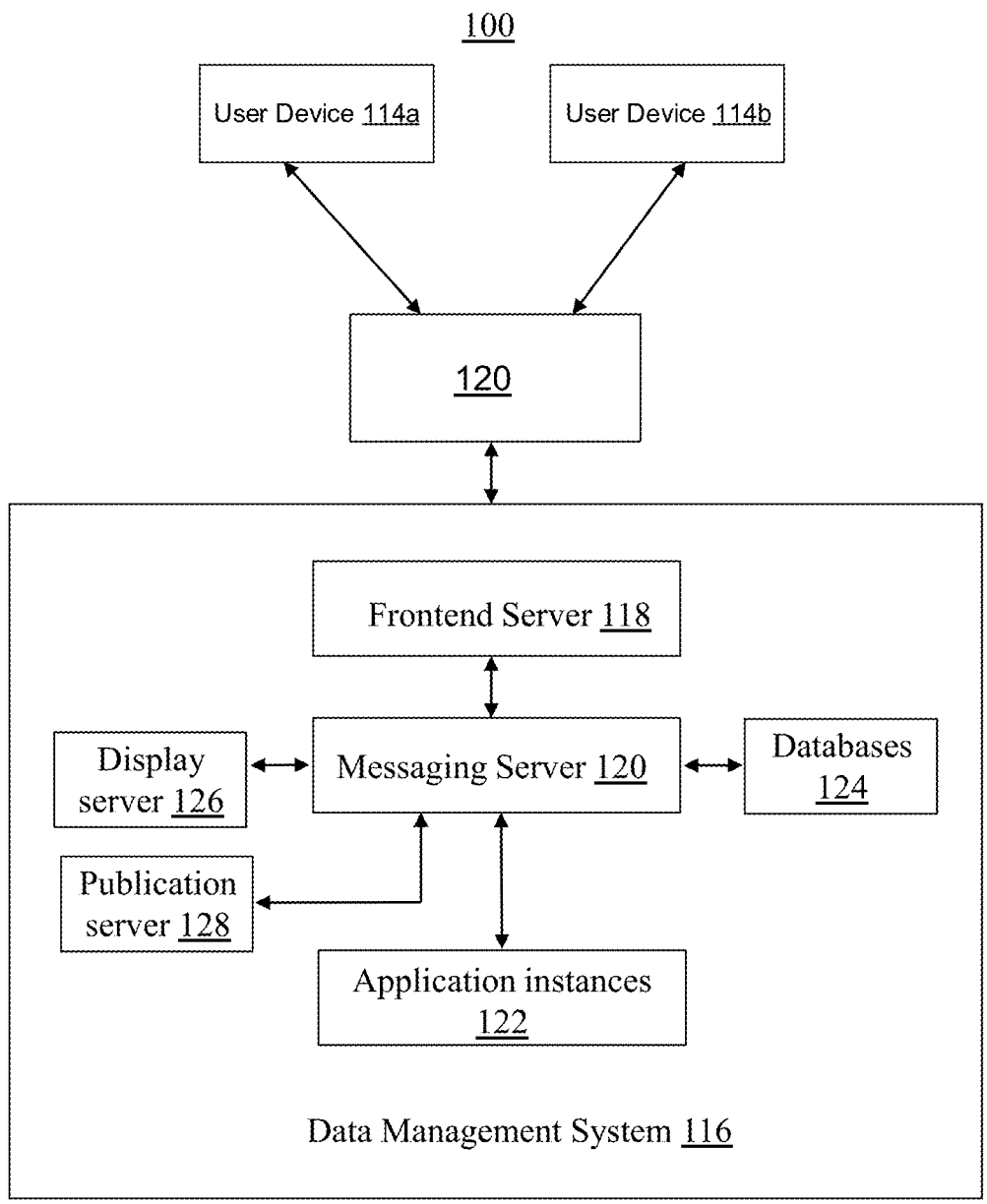
FIG. 1 shows a block diagram of a data processing system within a network environment, according to some embodiments of the invention.

FIG. 1 shows a block diagram of a data processing system 116 within a network environment 100, according to some embodiments of the invention. The network environment 100 generally includes one or more user computing devices (hereinafter referred to as user devices) 114, a data processing system 116, and a communication network 120.

The communication network 120 enables the components of the network environment 100 to communicate with each other to perform the data processing as described herein. The communication network 120 may be a local network, such as a LAN, or a wide area network, such as the Internet and/or a cellular network. In some embodiments, the network 120 is comprised of several discrete networks and/or sub-networks (e.g., cellular to Internet) that enable the components of the environment 100 to communicate with each other.

A user, who is most likely a non-developer user, can make, via at least one of the user devices 114 over the communications network 120, a request to the data processing system 116 to access a computerized resource (e.g., real time data) in a desired format. For example, the data processing t system 116 allows business users to create a process to handle orders, executions and other streaming data requests to generate alerts or notifications in real time in production environment without involving developers' support. In the context of the present invention, a "non-developer user" refers to a person not proficient in software development, software maintenance, application life cycle management, or the like.

Each of the user devices 114 can be a computing device with a processor and memory that can execute instructions and network connectivity, send or receive data from the internet, and capable of communication over a graphical user interface. Exemplary user devices 114 include but are not limited to desktop computers, laptop computers, tablets, mobile devices, smartphones, and internet appliances. It should be appreciated that other types of computing devices that are capable of connecting to the components of the data processing environment 100 can be used without departing from the scope of invention. In some embodiments, a graphical user interface is accessible via each user device 114, where the user interface can be implemented as a web portal with controlled access to the backend data processing system 116. In general, the web-based user interface enables a user to create, test and deploy complex set of rules to process one or more live or historical data streams along with reference data. Specifically, the user interface is configured to allow a user to build the rules as logical queries on the one or more data streams by customizing processing goals (e.g., expected results) for the data streams. In some embodiments, data access requests, service requests and subscription requests can be made and validated via the user interface before forwarding them to the backend data processing system 116 for processing.

The data processing system 116 is configured to receive and process a user's instructions on how to handle data stream(s) and communicate results back to the user via the corresponding user interface in a specified form of output. In some embodiments, the data processing system 116 is a scale-able C++ engine that uses its own autonomous data ontology and semantics to generate the results. The data processing system 116 can be a combination of hardware engines, including one or more processors and one or more physical memory modules, and specialized software engines that execute on the one or more processors. In an exemplary configuration, the data processing system 116 includes a frontend application server 118, such as an Apache Tomcat server, configured to service a user's requests. The frontend application server 118 functions as an interface between the user interfaces on the user devices 114 and the backend components, including the messaging server 120, the application instances 122, and the databases 124. The messaging server 120, which can be implemented as an Apache AMQ server, functions as the main message bus between various components of the data processing system 116. In some embodiments, the messaging server 120 is configured to be stateless, where all message types are topic (i.e., non-queue) based. The application instances 122 represent the main application that interprets user requests, processes live and reference data, implements execution plans and generates outputs, such as alerts, messages, emails, etc. In some embodiments, there are at least three application instances 122 running at any given time—a first instance is used to test newly created execution plans with outputs sequestered so as not to impact live output channels; a second instance is reserved for any execution plan recently created and promoted to the live production mode after the testing stage; and a third instance is used for deployed execution plans, which are those in-flight plans that are not to be impacted by any new activities. The databases 124 are configured to serialize and persist any configuration changes, store alerts and generate compliance reporting.

In some embodiments, the data processing system 116 includes one or more additional servers/processors for executing certain auxiliary functions. For example, the data processing system 116 can include a display server 126 configured to cache and manage live data display to a user, including alerts, log messages, debugging status, etc. The data processing system 116 can also include an email server 128 used to aggregate the system's email alerts before sending them to the users to protect against a possible overload. A user can control the aggregation interval when configuring email alerts.

Figure 2:
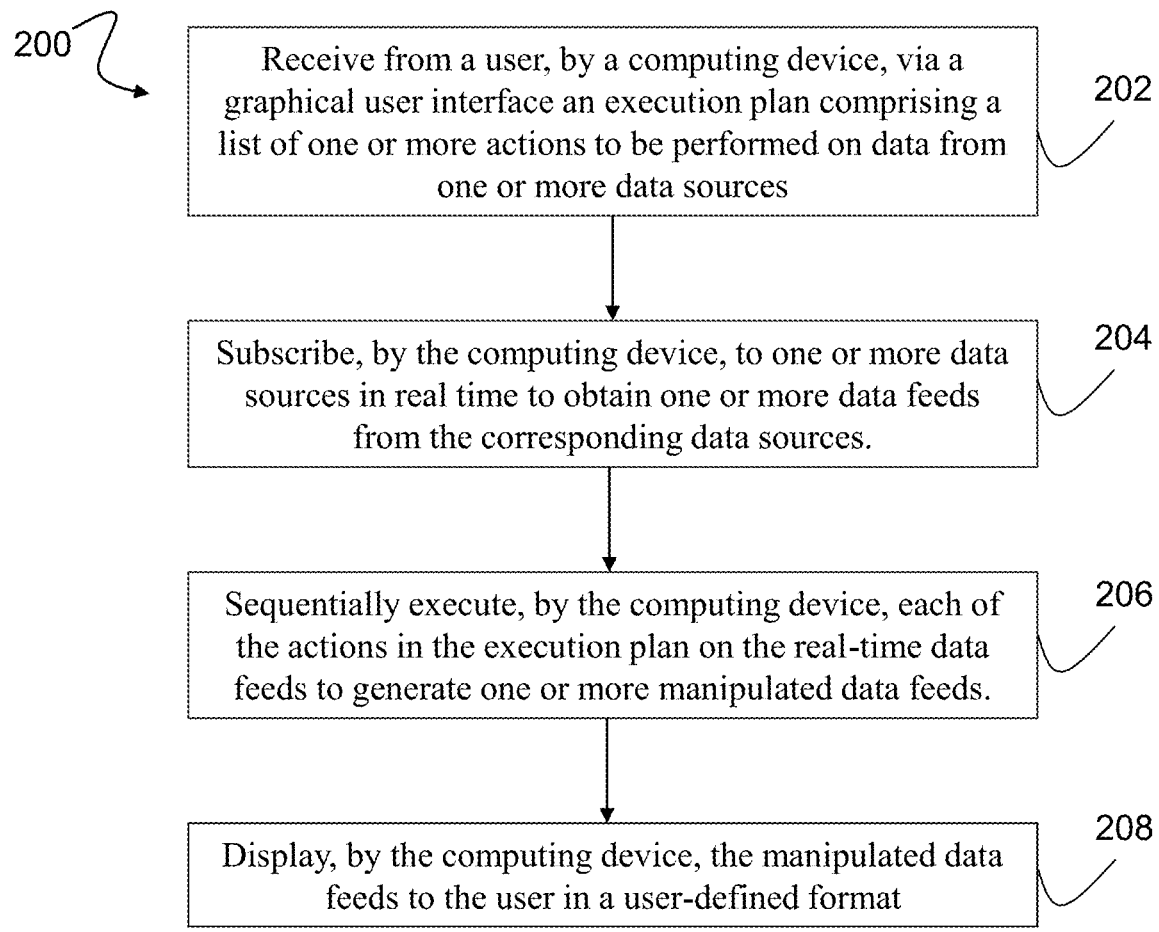
FIG. 2 shows an exemplary flow diagram of a computerized method executed by the data processing system of FIG. 1, according to some embodiments of the present invention.
Figure 3:
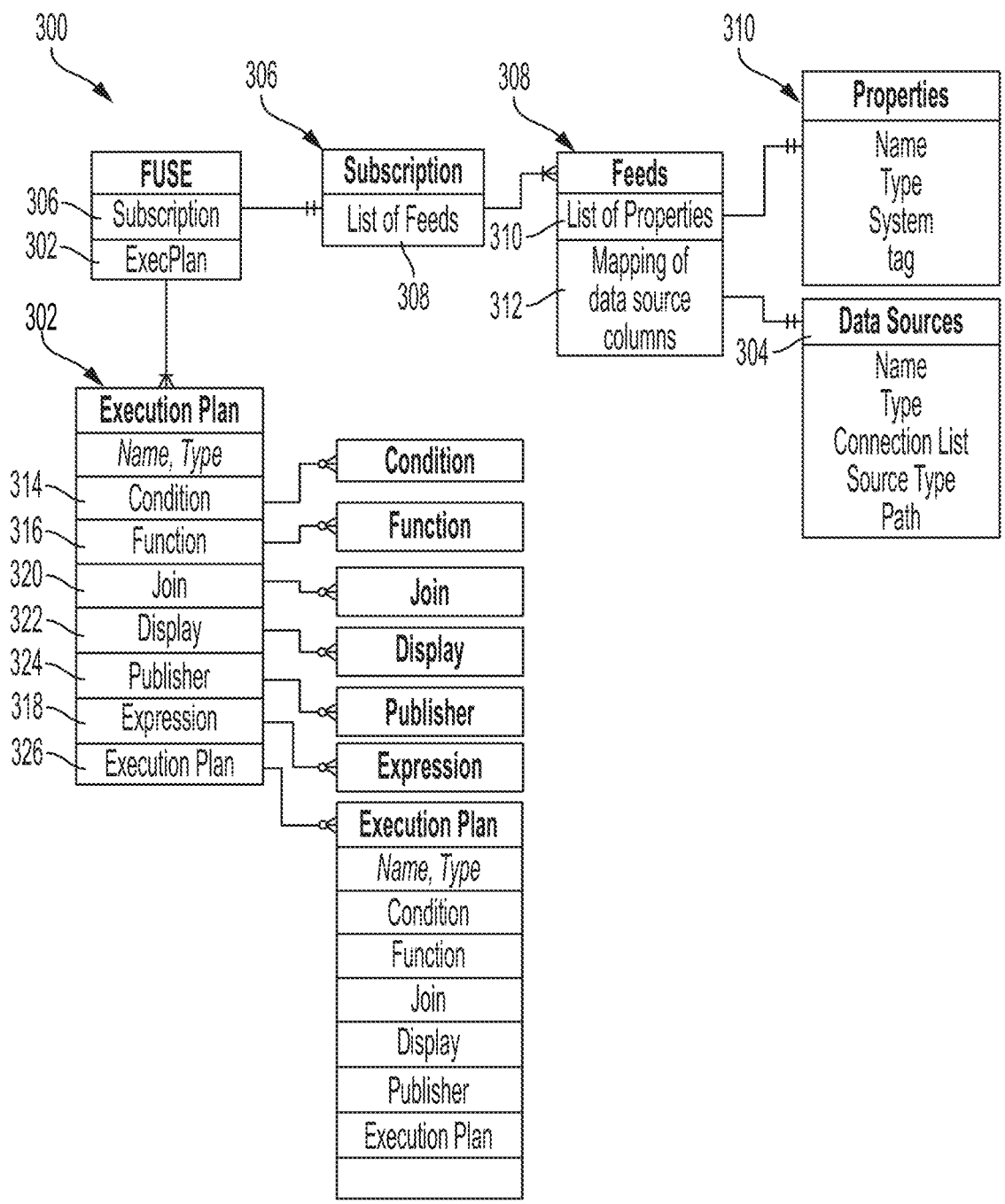
FIG. 3 shows an exemplary relationship diagram of various components of the data processing system of FIG. 1 for executing the computerized method of FIG. 2, accordingly to some embodiments of the present invention.

FIG. 2 shows an exemplary flow diagram of a computerized method 200 executed by the data processing system 116 of FIG. 1 for allowing a user to manipulate data from desired data sources from an interactive user interface, according to some embodiments of the present invention. FIG. 3 shows an exemplary relationship diagram of various components of the data processing system 116 of FIG. 1 for executing the computerized method 200 of FIG. 2, accordingly to some embodiments of the present invention.

Figure 5:
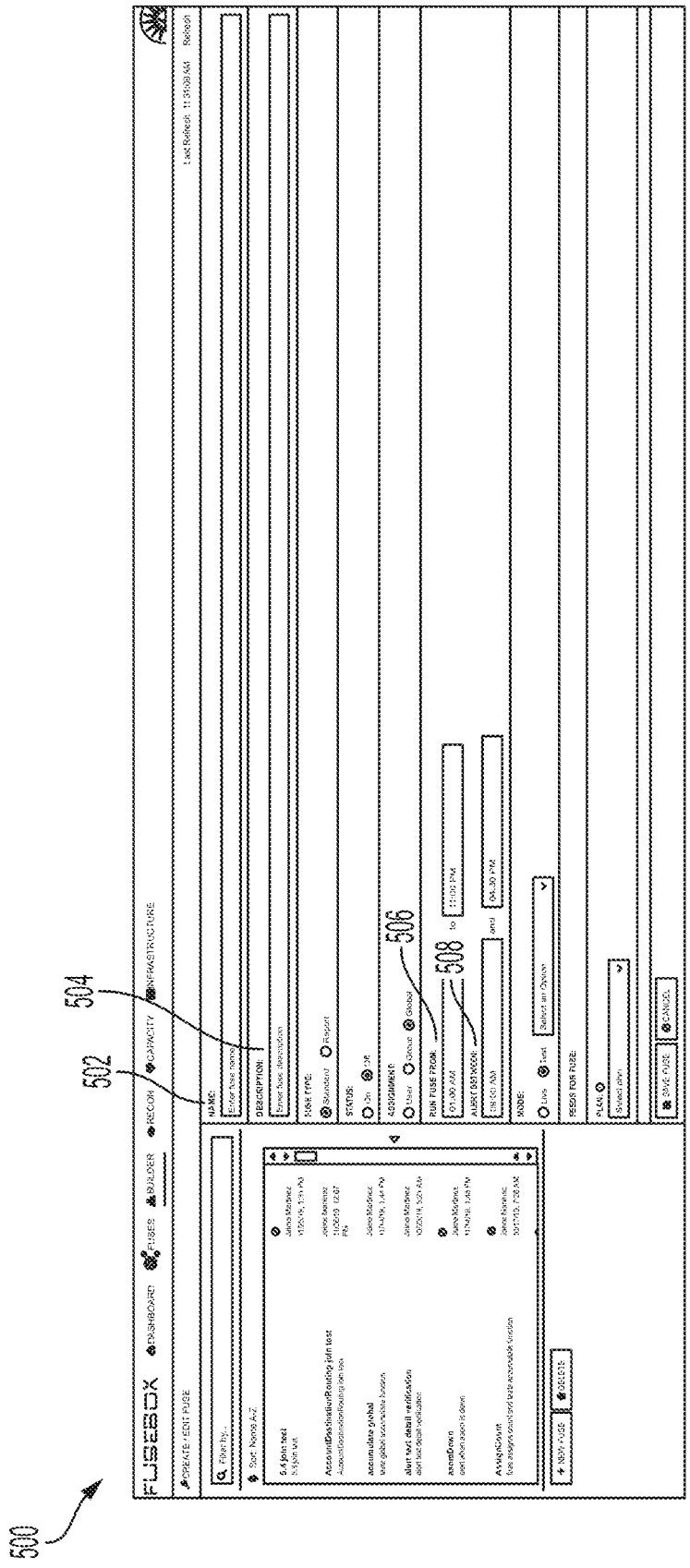
FIG. 5 shows an exemplary graphical user interface displayed on a user's device by the data processing system for building of an execution plan, according to some embodiments of the present invention.

Referring to FIG. 2, the computerized method 200 starts at step 202, where the data processing system 116 receives from the user via a graphical user interface on the user's device 114 an execution plan 302 (shown in FIG. 3) that includes a list of one or more actions to be performed on data from user-specified data sources 304 (shown in FIG. 3). As described above, the user interface, which can be graphical and web-based, provides the user with an interactive portal to specify actions to be perform on data from certain data sources. For each execution plan 302, the user interface can allow the user to define the actions and identify the data sources in a human-readable (free text) format. The user can also provide a name for the execution plan 302. In some embodiments, the user interface is a fillable form that predefines a list of actions selectable by a user, such as in a drop-down menu. FIG. 5 shows an exemplary graphical user interface displayed on a user's device 114 by the data processing system 116 for building of an execution plan 302, according to some embodiments of the present invention. Specifically, this interface 500 shows a control/landing page that allows a user to start building an execution plan 302 by specifying various parameters associated with the plan 302, such as the plan name 502, description 504, run time period 506, and alert time period 508.

The user interface subsequently converts these requests into a computer-readable format, such as into a JavaScript Object Notation (JSON) object, before sending them to the frontend server 118 for processing and to the databases 124 for serialization. For example, after receiving a JSON-based request from the user, the frontend server 118 converts the content of the request into a local object and stores it in the database 124. The frontend sever 118 can represent each user-requested action as a rule that includes 2 main sections—one section captures information about the data sources and the other section captures a plan executable on the data from the data sources.

Figure 6:
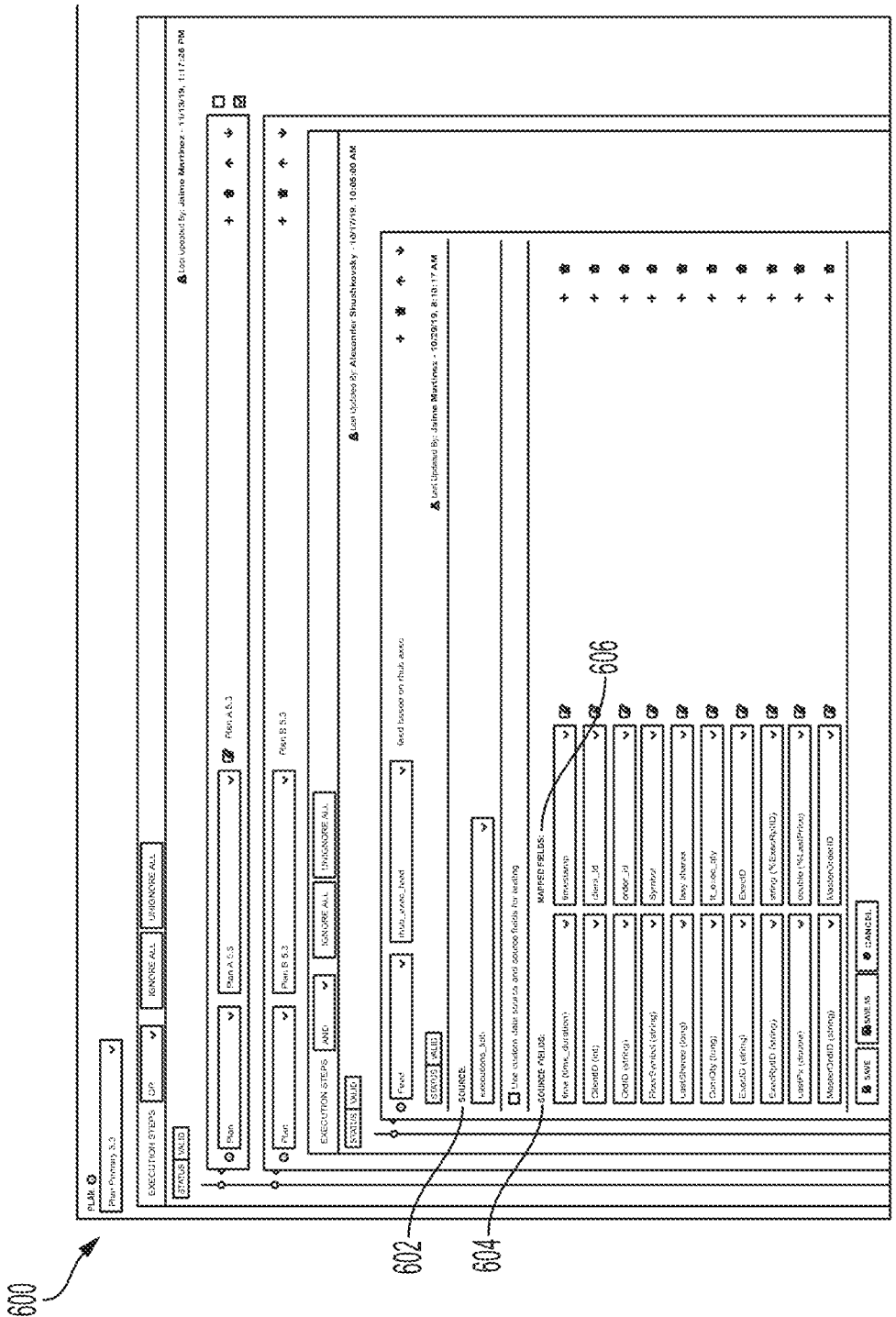
FIG. 6 shows an exemplary graphical user interface displayed on a user's device by the data processing system for continuing to build an execution plan, according to some embodiments of the present invention.

At step 204, for each given action/rule, the frontend server 118 can create a subscription 306 (shown in FIG. 3) to one or more associated data sources 304 in real time. Such subscription 306 allows the data processing system 116 to parse each data source 304 into a data feed 308 usable for subsequent calculations. Specifically, the data processing system 116 processes data streamed from a data source 304 by mapping the streaming data to a feed 308 (shown in FIG. 3), where each feed 308 includes (i) one or more locally-defined properties 310 assigned to the streaming data and (ii) metadata 312 describing the mapping between the original data source and the properties. In some embodiments, each property 310 is a variable, such as a name, type, order identification and/or tag. Each property 310 can be matched to a corresponding field or column from the data source 304. In some embodiments, because data streaming from the data sources are in real time, the data feeds for various data sources are generated at different times. FIG. 6 shows an exemplary graphical user interface displayed on a user's device 114 by the data processing system 116 for continuing to build an execution plan 302, according to some embodiments of the present invention. This interface 600 allows the user to further define an execution plan 302 by specifying the data source(s) 602 based on which the plan 302 executes. The user can also specify, via the interface 600, how each data source can be mapped to an internal data feed by specifying the fields 604 of the data sources for mapping to specific fields 606 of the corresponding data feeds.

As an example, if a user wishes to process a data stream containing trade order information, the frontend server 118 can map the data to a feed associated with the following order-related properties-order identification, symbol, side, size and price. The order identification can be defined as a string, the symbol as a string, the side as a character, the size as an integer and the price as a double. In some embodiments, these properties 310 only need to be created once within the data processing system 116 and are stored in the databases 124, which are subsequently applicable to all data of the same data type (i.e., other data streams containing trade order information). Thus, an order-related data feed can be create by mapping and parsing data being streamed from a data source in real time or near real time to extract information matching the order-related properties described above. Even though the data stream from the data source may include many more properties, these unnecessary properties are ignored when creating the data feed. Once feeds are created, the data processing system 116 can use the feeds as the building block for subsequent data manipulation as specified in an execution plan generated at step 202, whereas the original data from the data sources is no longer needed. Thus, a data feed 308 represents a collection of properties assembled in a single message passed as an input to an execution plan. In some embodiments, mapping can be done between two different data feeds. For example, property XYZ of Feed A can be mapped to property ABC of feed B, as long as both of the underlying data types are the same.

At step 206, the data processing system 116 is configured to sequentially execute each of the actions in the execution plan (from step 202) on the real-time data feeds (from step 204) to generate one or more manipulated data feeds as desired by the user. Generally, each action of an execution plan represents a logical step for manipulating the data feeds, where the action can be a condition 314, a function 316, an expression 318, a join 320, a display request 322, a publishing request 324, and/or another nested execution plan 326, all of which are illustrated in FIG. 3. Execution of each action can result in a manipulated feed or nothing at all if no output can be generated. Thus, an execution plan 302 represents a collection of logical steps applicable to an incoming, real-time data feed 308 in order to produce a desired outcome.

As explained above, each action is a pre-defined object selectable by a user from the user interface, the selection of which also requires the user to specify the one or more data source(s) and/or the properties of the data from the data sources on which the action is to be performed. For example, a join action 320 requires a user to provide the two or more data sources with data to be joined, the properties of data to be joined, and the manner this merger occurs. A condition action 314 requires a user to provide a property whose value is to be examined and the manner to examine that property. A display action 322 requires a user to define how to display a manipulated data feed (such as what values from the feed's properties to display) or how to display an alert. A publishing action 324 requires a user to provide details of where to send the data feed or alert, such as emailing it to a specific address.

As explained above, an action can define a function 316 that processes a data feed as an input and returns a manipulated data feed as an output. A function 316 can include memory operations for implementing time related checks, aggregations, etc. For example, a function 316 can be a "key" operation that adds a field to a data feed described by a property "key," which can be used later in other forms that do not specifically provide the key, i.e. sets a default value for a key in a data feed. The key is configurable by a user from the user interface at step 202.

A function 316 can be a "distinct" operation that saves the first occurrence of a key in a data feed in the database 124 (where the key can be defined using the "key" function described above) and filters out all subsequent data in the data feed containing the same key. The same "distinct" function 316 involving the same key can be used in multiple locations in an execution plan.

A function 316 can be a "count" operation that maintains a count of the number of times a provided key, which can be defined using the "key" function described above, appears in a data feed over a user-specified time period. For example, the "count" function may calculate that in the last 10 seconds, the real-time data feed received 3 orders for symbol AAPL, 5 orders for symbol 'F' and 0 orders for symbol AMZN. The window of time can shift forward at one-second intervals. For example, the count from this function can cover a period of time from "NOW" minus a configurable duration in seconds. Both the time window and the key are configurable by a user via the user interface at step 202. The same "count" function involving the same time window and key can be used in multiple locations in an execution plan.

A function 316 can be a "timer" operation, which, upon receipt of a data feed, creates an internal data feed of type "timer" with an added key provided by a user. This newly created "timer" data feed is fed back to the execution plan once a user-specified, configurable timeout period is reached. The user can create an execution plan that involves the "timer" data feed to create time-related logics. For example, a "timer" data feed can be used to determine if an order has been executed within a given time frame and alert the user if it has not. Since this timer function is implemented as a data feed, it allows a user to test historical data feeds that can be rerun at a faster or slower pace than the original feed flow.

A function 316 can be a "split" operation that copies a given data feed under a user-specified feed name and uses the newly-named data feed in the execution plan for additional processing. This allows a user to save an original version of a data feed and/or manipulate each copy in a different way without altering the original data feed.

A function 316 can be an "aggregation" operation that allows a user to specify which property (i.e., field) of a data feed to be aggregated and what that property should be aggregated by. For example, a user can configure an aggregate function to count the total executed shares of all orders for symbol AAPL. Optionally, a user can also specify the time window for the aggregation, such as the number of shares executed for symbol AAPL over a specific period of time. This function is helpful as the resulting value can be used in a subsequent action to calculate, for example, a rate at which AAPL orders are executed and alert users if that rate breaches a particular threshold.

In some embodiments, an action of an execution plan defines an expression 318 that performs mathematical calculations on values of one or more properties of one or more user-specified data feeds. The results of the calculation can be a new property (i.e., field) in the data feed.

Figure 7:
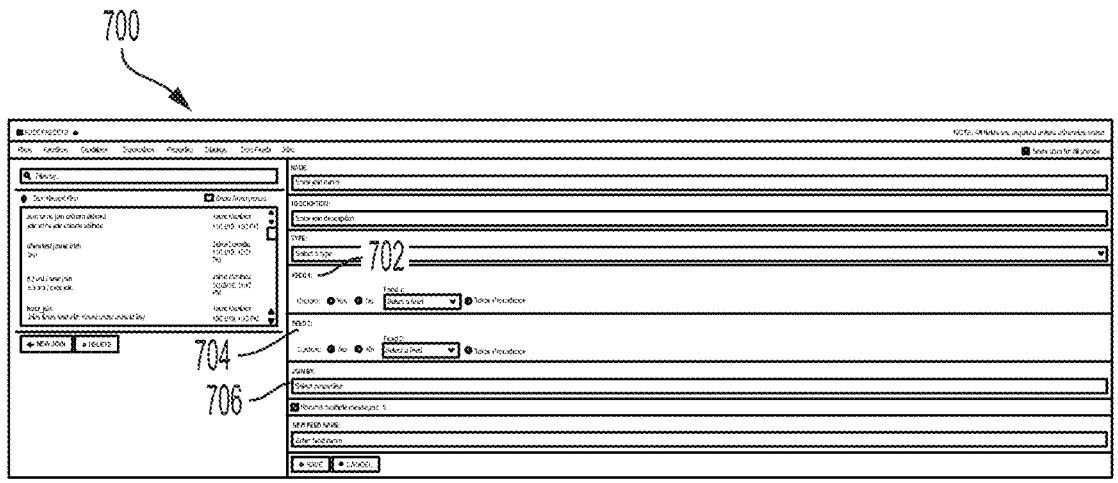
FIG. 7 shows an exemplary graphical user interface displayed on a user's device by the data processing system for performing a join operation, according to some embodiments of the present invention.

In some embodiments, an action of an execution plan defines a join operation 320 that enables a user to effectively utilize static data as well as combine various real-time data feeds into one. In an exemplary implementation, the data processing system 116 uses a "key" property and feed names of data feeds, both of which are supplied by the user, to perform a join operation. Specifically, the data processing system 116 can join values of the "key" properties in the user-specified data feeds to create a new, joined data feed. The key properties can be set up in advance of the "join" operation by using the "key" function described above. Because the data feeds used in the "join" function can be based on real-time data streams, the values needed for the "join" function are not necessarily present at the same time and can in fact become available at different time intervals. In some embodiments, the joining of two or more data feeds comprises joining the data feeds that have matching key properties. In some embodiments, the joining of two or more data feeds comprises excluding a first data feed from a second data feed. FIG. 7 shows an exemplary graphical user interface displayed on a user's device 114 by the data processing system 116 for performing a join operation, according to some embodiments of the present invention. This interface 700 allows a user to define parameters for performing a join operation of an execution plan. As shown, the user can specify the two data feeds 702, 704 to be joined, and more specifically, the properties 706 of the selected data feeds 702, 704 to be joined.

In some embodiments, when joining two data feeds "feed 1" and "feed 2", the data processing system 116 needs to know which data feed takes precedence. In one scenario, upon receipt of "feed 2," the data processing system 116 saves the data feed and pauses the current execution plan until "feed 1" is received by the processor. Once "feed 1" is received, the data processing system 116 attempts to match the two data feeds (i.e., joins the data feeds if they have matching properties) and resumes the execution plan regardless whether the match/joining is successful. Alternatively, the execution plan is not paused when "feed 2" data stream is received for the joining operation. In some embodiments, upon receipt of "feed 1," the data processing system 116 saves the data feed and pauses the current execution plan until "feed 2" is received by the processor. Once "feed 2" is received, the data processing system 116 attempts to match the two data feeds (i.e., joins the data feeds if they have matching properties). If a match/joining is not successful, the execution plan stops. The execution plan is only resumes if a match/joining is successful. In some embodiments, "feed 1" is saved for later matching without stopping the current execution plan, while "feed 2" is saved only and until a match is found. The execution plan does not continue until a match is found. In some embodiments, if a match is found, the data processing system 116 saves the joint version of "feed 1" and "feed 2" and stops the execution plan. This option can be activated by the user for reporting purposes. In cases where no matching of two data feeds occur such that the data feeds cannot be joined, upon receipt of "feed 2," the data processing system 116 saves the data feed and pauses the current execution plan until "feed 1" is received by the processor. Once "feed 1" is received, the data processing system 116 attempts to match the two data feeds (i.e., joins the data feeds if they have matching properties) and resumes the execution plan unless the match/joining is successful. In some embodiments of the no-match scenario, the execution plan is paused and the discrepancy between the two feeds are reported to the user.

In some embodiments, an action of an execution plan defines a condition operation 314 that functions as a filter of a user-specified data feed. Application of a "condition" function can result in either passing or eliminating a data feed. One type of "condition" function uses comparison operands to evaluate a property of a data feed, such as compare values in a property/field to a user-specified threshold to determine if the values satisfy the threshold. Another type of "condition" function returns a feed only if the feed name satisfies a condition.

In some embodiments, an action of an execution plan comprises a second execution plan nested within the first execution plan. There can be two types of nested execution plans: "OR" and "AND". In an "AND" type nested execution plans, conditions and/or functions are executed sequentially for the series of nested execution plans until the first failure is encountered. In an "OR" type nested execution plans, conditions and/or functions are executed sequentially for the series of nested execution plans until the first success is encountered. These two types can be used as stored macros of various actions.

Figure 8:
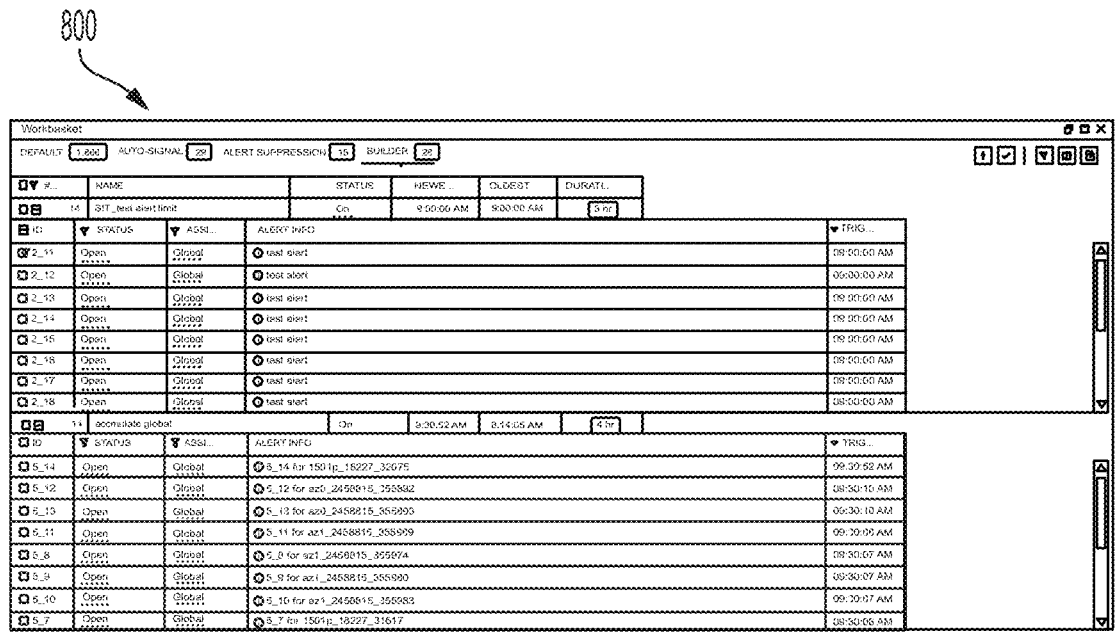
FIG. 8 shows an exemplary graphical user interface displayed on a user's device by the data processing system for presenting outputs, including alerts, generated by at least one execution plan, according to some embodiments of the present invention

In some embodiments, an action of an execution plan allows a user to define how the results generated by an execution plan can be displayed 322. Generally, there can be two types of display—(i) a feed-based display that outputs contents of a manipulated data feed in a format specified by the user, which can be used by the user to debug the execution plan during its design stage, for example; and (ii) an alert-based display that outputs a text-based alert if certain conditions of the execution plan are not met and/or no manipulated data feeds are generated by the execution plan. An action of an execution plan can also allow a user to define how the results generated by an execution plan can be published 324, such as indicating where to send the manipulated data feed (e.g., to a file, a table, an email address, the user interface from which inputs are supplied, etc.). Thus, at step 208, the data processing system 116 can utilize the display server 126 and the publication server 128 to send and display the manipulated data feeds to the user at user specified destination and in a user-defined format. FIG. 8 shows an exemplary graphical user interface 800 displayed on a user's device 114 by the data processing system 116 for presenting outputs, including alerts, generated by at least one execution plan, according to some embodiments of the present invention.

Figure 4:
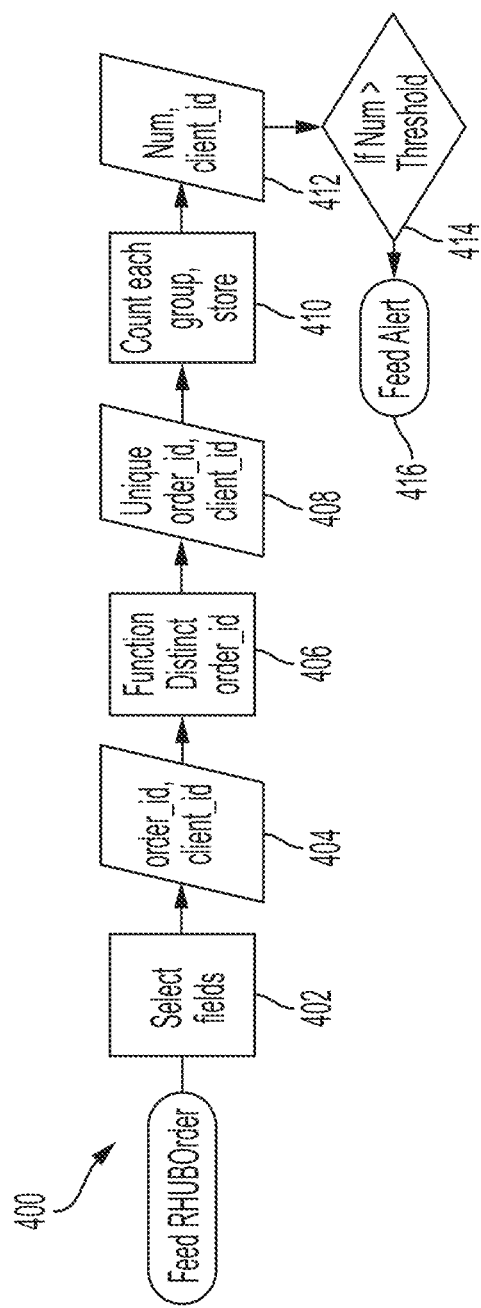
FIG. 4 shows implementation by the data processing system of FIG. 1 of an exemplary execution plan, according to some embodiments of the present invention.

FIG. 4 shows implementation by the data processing system 116 of FIG. 1 of an exemplary execution plan 400, according to some embodiments of the present invention. The plan 400 can be used to determine whether the number of orders sent by a client with a specific client ID in a specific data feed over a given time interval exceeds a provided threshold. During execution, the data processing system 116 can apply the "key" function (step 402) to select data associated with the properties "order ID" and "client ID" in a given data feed (step 404). The data processing system 116 can then apply the "distinct" function (step 406) to extract information from the order ID data and client ID data pertinent only to the given client ID (step 408). The data processing system 116 can then apply the "count" function and the "timer" function (step 410) to count the number of times an order has been made under the given client ID in a given time period (step 412). Finally, the data processing system 116 can apply the "condition" operation to determine if this number exceeds a given threshold (step 414). The result of the comparison can be displayed and sent to the user as an alert via the use of the display and publish functions (step 416).

In another aspect, the data processing system 116 allows new execution plans to be created by users in real time in production environment and tested/debugged without influencing live execution plans through the use of multiple application instances 122 as shown in FIG. 1. Execution plans in testing phases are assigned their own instances and can be promoted to live mode without changing any of the rules/actions. Thus, creation of new execution plans does not require restart or rebuilding of the system 116. The system 116 can also keep track of its own performance in real time and scales automatically across available instances 122 on the network 120. For example, a manager module of the data processing system 116 can be used to keep track of all available instances 122, including automatically assigning new execution plans to the least loaded engines. The manager module can also track the overall performance of each instance 122 and has the ability to recover execution plans that are stalled during execution. In some embodiments, a user has the ability to upload data files via the user interface, where the data files can be used by the execution plans at run time. Further, the data processing system 116 can record user actions and store the recordings in the database 124, which can be used to construct various compliance reports.

Thus, the present invention offers a framework in which users build logical chains that start with instructions regarding how to process one or more subscribed data feeds and end with a manipulated version of the data feeds that may represent, for example, an alert or a structure used by downstream processes.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method for permitting a user to manipulate data feeds via a graphical user interface, the computer-implemented method comprising:
   receiving, by a computing device, data streams at different times over a communications network from a plurality of data sources;
   parsing, by the computing device, the data streams in real time by mapping the data streams to one or more predefined properties and extracting the data streams based on their mapped properties to form data feeds, each data feed corresponding to a unique data source in the plurality of data sources;
   receiving from the user, by the computing device, via the graphical user interface an execution plan comprising a list of a plurality of actions to be performed on the data feeds, wherein the plurality of actions are in a human-readable format;

sequentially executing, by the computing device, each of the plurality of actions in the execution plan on the real-time data feeds to generate one or more manipulated data feeds, executing the plurality of actions comprises applying at least (i) a function defined by the execution plan to at least one of the data feeds, and (ii) a join command for joining two or more of the data feeds that have desired properties defined by the execution plan; and displaying, by the computing device, the manipulated data feeds to the user in a user-defined format via the graphical user interface.

2. The computer-implemented method of claim 1, further comprising converting the plurality of actions from the human-readable format into a JavaScript Object Notation (JSON) format prior to executing the execution plan.

3. The computer-implemented method of claim 1, wherein joining two or more of the data feeds comprises joining the data feeds that have matching properties.

4. The computer-implemented method of claim 1, wherein joining two or more of the data feeds comprises excluding a first data feed from a second data feed.

5. The computer-implemented method of claim 1, wherein the plurality of actions include filtering the data feeds that comprises:

determining if at least one of the data feeds has properties that match a filtering condition; and returning the at least one data feed if a match is found.

6. The computer-implemented method of claim 1, wherein the function comprises a mathematical expression applied to values of the at least one data feed.

7. The computer-implemented method of claim 1, further comprising testing and debugging a new execution plan in real-time without influencing the execution plan that is currently being executed.

8. The computer-implemented method of claim 1, further comprising allowing the user to subscribe to, via the graphical user interface, a future data feed whereby the computing device automatically parses the future data feed based on a user-specified property and returns the parsed data feed to the user.

9. The computer-implemented method of claim 1, further comprising publishing, by the computing device, the manipulated data feeds by sending the manipulated data feeds to a user-specified location.

10. A computer system configure to manipulate data feeds based on instructions from a user, the computer system comprising:

a data intake module configured to (i) receive data streams at different times over a communications network from a plurality of data sources, and (ii) parse the data streams in real time by mapping the data stream to one or more predefined properties and extracting the data streams based on their mapped properties to form data feeds, each data feed corresponding to a unique data source in the plurality of data sources;

a display module configured to generate a graphical user interface permitting the user to define an execution plan comprising a list of a plurality of actions, in a human-readable format, to be performed on the data feeds; and an execution module configured to sequentially execute each of the plurality of actions in the execution plan on the data feeds to generate one or more manipulated data feeds, the execution module configured to apply at least (i) a function defined by the execution plan to at least one of the data feeds, and (ii) a join command for joining two or more of the data feeds that have desired properties defined by the execution plan;

wherein the display module is configured to display the manipulated data feeds to the user in a user-defined format via the graphical user interface.

11. The computer system of claim 10, wherein the execution module is further configured to convert the plurality actions from the human-readable format into a JavaScript Object Notation (JSON) format prior to executing the execution plan.

12. The computer system of claim 10, wherein join two or more of the data feeds by the execution module comprises the execution module joining the data feeds that have matching properties.

13. The computer system of claim 10, wherein join two or more of the data feeds by the execution module comprises the execution module excluding a first data feed from a second data feed.

14. The computer system of claim 10, wherein the execution module is configured to filter the data feeds by determining if at least one of the data feeds has properties that match a filtering condition, and returning the at least one data feed if a match is found.

15. The computer system of claim 10, further comprising a subscription module configured to allow the user to subscribe to, via the graphical user interface, a future data feed whereby the subscription module automatically parses the future data feed based on a user-specified property and returns the parsed data feed to the user.

16. The computer system of claim 10, further comprising a publisher module configured to send the manipulated data feeds to a user-specified location.

* * * * *